United States Patent
Kemperman et al.

(10) Patent No.: US 11,582,902 B2
(45) Date of Patent: Feb. 21, 2023

(54) VORTEX PREVENTION ADAPTER AND RELATED SYSTEMS

(71) Applicant: AGCO INTERNATIONAL GmbH, Neuhausen (CH)

(72) Inventors: Bram J. A. Kemperman, Grubbenvorst (NL); Guill Roefs, Grubbenvorst (NL)

(73) Assignee: AGCO International GmbH, Neuhausen (CH)

( * ) Notice: Subject to any disclaimer, the term of this patent is extended or adjusted under 35 U.S.C. 154(b) by 142 days.

(21) Appl. No.: 17/138,727

(22) Filed: Dec. 30, 2020

(65) Prior Publication Data
US 2021/0120732 A1    Apr. 29, 2021

Related U.S. Application Data

(63) Continuation of application No. 16/185,993, filed on Nov. 9, 2018, now abandoned.

(51) Int. Cl.
| | |
|---|---|
| *A01C 23/04* | (2006.01) |
| *A01M 7/00* | (2006.01) |
| *B01F 25/312* | (2022.01) |
| *B01F 35/00* | (2022.01) |
| *B01F 35/53* | (2022.01) |

(52) U.S. Cl.
CPC ......... *A01C 23/047* (2013.01); *A01M 7/0085* (2013.01); *B01F 25/312* (2022.01); *B01F 35/531* (2022.01); *B01F 35/55* (2022.01)

(58) Field of Classification Search
CPC .. B01F 5/043; B01F 5/0413; B01F 15/00883; B01F 15/00915; B01F 25/312; B01F 35/531; B01F 35/55; A01M 7/0092; A01M 7/0085; A01C 23/042; A01C 23/047
USPC .......................... 366/163.2; 137/590; 138/39
See application file for complete search history.

(56) References Cited

U.S. PATENT DOCUMENTS

| | | | | |
|---|---|---|---|---|
| 2,946,345 | A * | 7/1960 | Weltmer | F16K 17/42 137/590 |
| 4,394,966 | A * | 7/1983 | Snyder | B01F 25/50 366/159.1 |
| 6,014,987 | A * | 1/2000 | List | B64D 37/08 137/590 |
| 9,004,101 | B2 * | 4/2015 | Beretta, III | E03B 11/04 137/590 |
| 9,004,706 | B1 * | 4/2015 | Banfield | F21V 33/0056 362/86 |
| 2013/0248028 | A1 * | 9/2013 | Ekholm | F17C 13/04 137/590 |

* cited by examiner

*Primary Examiner* — Cody J Lieuwen (57) ABSTRACT

An apparatus to prevent formation of a vortex has a ring-shaped gasket having a bottom surface and a top surface; and a blade assembly mounted on the top surface and comprising a center portion and plural blades of a defined height. Each of the blades extend from the center portion to the top surface, with each pair of the plural blades defining a filter based at least in part on spacing between the pair of plural blades.

20 Claims, 6 Drawing Sheets

VORTEX PREVENTION ADAPTER AND RELATED SYSTEMS

CROSS-REFERENCE TO RELATED APPLICATION

This application is a continuation of U.S. patent application Ser. No. 16/185,993, "Vortex Adaption Preventer," filed Nov. 9, 2018, the entire disclosure of which is incorporated herein by reference.

FIELD

The present disclosure is generally related to chemical dispensing, and more particularly, agricultural spraying equipment.

BACKGROUND

Chemical dispensing is important in many industries. For municipalities, chemical dispensing in the form of brine solutions or anti-freeze material on roads helps to prevent freezing to prevent unsafe road conditions such as ice build-up. In agriculture, self-propelled and/or towed spraying equipment are used to dispense various products onto a field that foster the growth of crops and/or hinder or prevent infestation of pests or weeds or other plants that are obstacles to efficient and productive harvesting.

Focusing on agricultural spraying equipment, before spraying operations are initiated, liquid or powder chemicals are transferred from an eductor, or similarly, inductor hopper, to a main tank. During filling of the main tank with fresh water, a plumbing system (e.g., venturi system) creates a suction effect in the eductor to draw out the chemicals. Due to the shape of the eductor and suction volume, a vortex may occur in the eductor. This vortex creates certain conditions in the plumbing system, including the tank, which may have negative consequences on the productivity of the spraying operation. For instance, the vortex may provide air in the plumbing system and/or foam in the tank, which may cause failures in tank volume measurements and/or provide a negative effect on rinse operations.

One solution, disclosed in EP 2946664, appears to reveal (see, e.g., FIG. 1) pin-shaped vortex break elements of any one of various cross sections (e.g., round, oval, polygonal, etc., as disclosed in paragraph [0016]) that preferably are structured to be much larger in length dimension than cross section (paragraph [0013]) that are disposed towards the bottom volume of a chemical dispenser container (e.g., drainage area, as described in the abstract). The break elements appear to permit the formation of a vortex initially to enable mixing of chemicals while also enabling the cleaning of the break elements. The break elements appear to progressively break the whirlpool or vortex action as the chemical swirls to the drain (see, e.g., paragraph [0013]). Other approaches are desired to provide cost effective solutions and/or solutions where the eductors operate according to a different design or parameters of operation.

BRIEF SUMMARY

In one embodiment, an apparatus to prevent formation of a vortex includes a ring-shaped gasket having a bottom surface and a top surface; and a blade assembly mounted on the top surface and comprising a center portion and plural blades of a defined height. Each of the blades extends from the center portion to the top surface. Each pair of the plural blades defines a filter based at least in part on spacing between the pair of plural blades.

These and other aspects will be apparent from and elucidated with reference to the embodiment(s) described hereinafter.

BRIEF DESCRIPTION OF THE DRAWINGS

Many aspects of a vortex prevention adapter and corresponding system of the present disclosure can be better understood with reference to the following drawings. The components in the drawings are not necessarily to scale, emphasis instead being placed upon clearly illustrating the principles of a vortex prevention adapter. Moreover, in the drawings, like reference numerals designate corresponding parts.

DETAILED DESCRIPTION

Certain embodiments of a vortex prevention adapter and associated systems and methods are disclosed that prevent the formation of a vortex in a chemical container (e.g., eductor, also known as an inductor hopper). In one embodiment, the vortex prevention adapter comprises a blade assembly mounted to a ring-shaped gasket. The blade assembly comprises plural blades connected to a center portion, each of the blades having multiple outer edges in an angular shape that interrupts the fluid (chemical) as the fluid is pulled by suction forces to the outlet of the eductor. The fluid first encounters the blade assembly at a peak formed by the plural blades. In one embodiment, end portions of the plural blades are interspersed along a top surface of a gasket by a respective member, each member physically coupled between the top surface of the gasket and the central portion of the blade assembly. The respective spacing between blades relative to the gasket define a first channel (e.g., when viewed in plan view) that permits the flow of the fluid, and the spacing between each blade and an adjacent member relative to the gasket define a second channel that comprises each of the bisected segments of the first channel. The second channel defines a filter comprising a filter size or mesh size that limits the passage of particulate matter while permitting chemical flow through the eductor and to a product tank. In some embodiments, a different configuration of blade and member quantities resulting in a different channel configuration may be used. For instance, in one embodiment, a pair of the plural blades may define a filter depending on the quantity of blades used and/or the diameter of the gasket and/or drain.

Digressing briefly, vortex formation in a process whereby chemicals in an eductor introduced into a main (product) tank during fresh water ingress to the tank may cause problems. The vortex enables the entry of air into the plumbing and product tank, which may hamper pump efficiency and/or, at least with some chemicals, cause foam to form in the tank, preventing the full capacity to be reached and possibly decreasing the effectiveness of the rinse cycle. Existing solutions include the use of breaking elements in the eductor proximal to the drain, though a vortex still appears to be permitted to initially form, which may add some uncertainty for different eductor designs and/or volumes, pump capacities, among other variables, as to whether enough has been done to break the vortex completely and prevent air ingress into the product tank and/or plumbing. By equipping the eductor with an embodiment of a vortex prevention adapter, vortex formation is prevented (or at least mitigated), enabling efficient operations of the spraying process without the risk that any vortex permitted to be created has not sufficiently been broken down.

Having summarized various features of certain embodiments of a vortex prevention adapter of the present disclosure, reference will now be made in detail to the detailed description of a vortex prevention adapter as illustrated in the drawings. While the disclosure is described in connection with these drawings, there is no intent to limit it to the embodiment or embodiments disclosed herein. For instance, though emphasis is placed on an environment comprising a towed sprayer implement (e.g., including wheeled implements or hitch (e.g., 3-point hitch) implements) for the agricultural industry, certain embodiments of a vortex prevention adapter may be used in a self-propelled unit and/or for chemical dispensing equipment in other industries. Further, although the description identifies or describes specifics of one or more embodiments, such specifics are not necessarily part of every embodiment, nor are all various stated advantages associated with a single embodiment. On the contrary, the intent is to cover all alternatives, modifications, and equivalents included within the scope of a vortex prevention adapter as defined by the appended claims. Further, it should be appreciated in the context of the present disclosure that the claims are not necessarily limited to the particular embodiments set out in the description.

Figure 1:
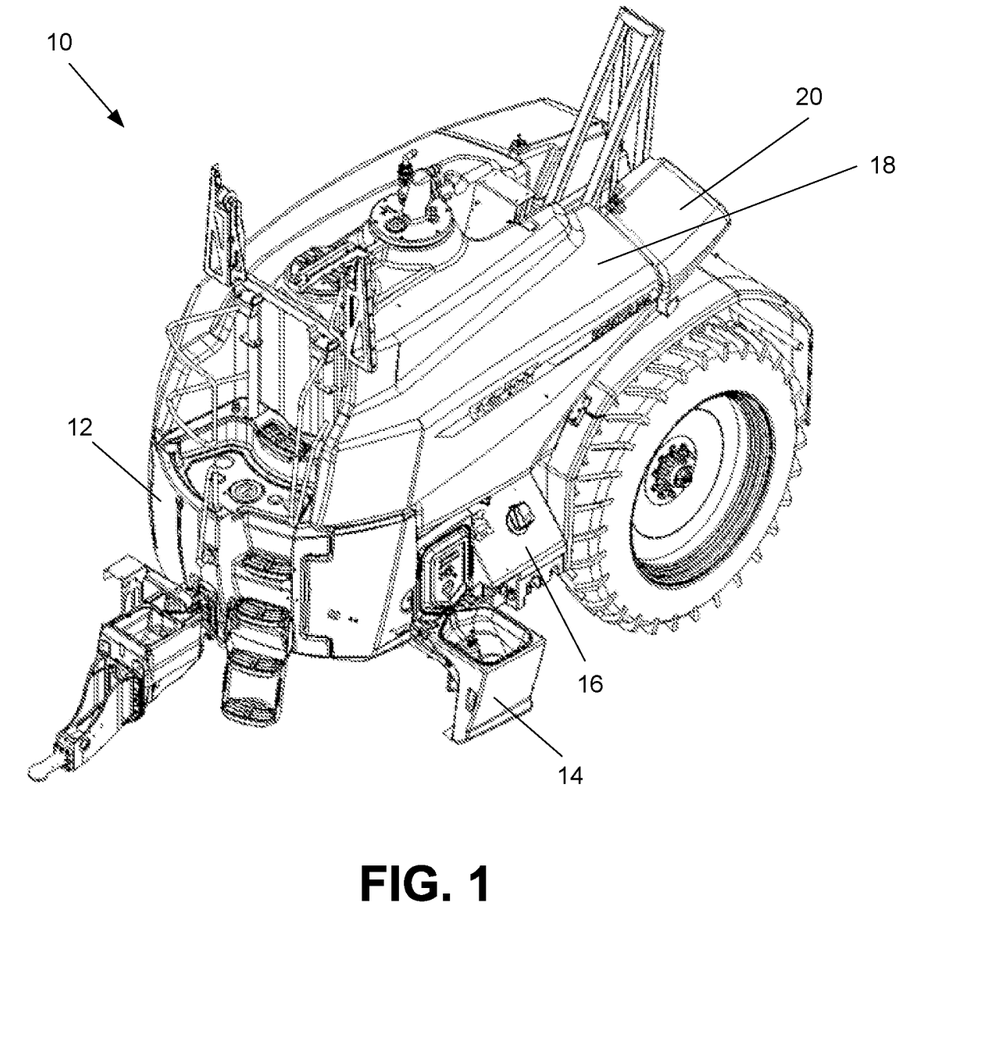
FIG. 1 is a schematic diagram of an example environment in which an embodiment of a vortex prevention adapter may be used.

Referring now to the drawings, FIG. 1 is a schematic diagram of an example environment in which an embodiment of a vortex prevention adapter may be used. In one embodiment, the environment comprises a system for spraying chemicals, for instance, a towed sprayer 10 (e.g., a sprayer towed by a machine, including a tractor, combine, etc., and including hitch assemblies). It should be appreciated by one having ordinary skill in the art in the context of the present disclosure that the environment may take the form of a different style of towed sprayer equipment or a self-propelled sprayer in the agricultural industry or other industries. The sprayer 10 comprises, fore and aft, among other components, a clean water tank 12 (and platform), a chemical eductor (also referred to herein as an inductor hopper, hopper, eductor) 14, a plumbing system 16 that comprises hoses and/or other fluid transport equipment that fluidly couples the eductor 14 with the clean water tank 12, a product tank 18, and an optional auxiliary clean water tank 20. For instance, the clean water tank 20 may be fluidly coupled to the clean water tank 12 for designs requiring a higher volume capacity. In some circumstances, the capacity may be mandated by local or federal regulations (e.g., requiring a water tank capacity that is 10% of the product tank volume), hence in some applications requiring the two tanks 12 and 20.

Figure 2:
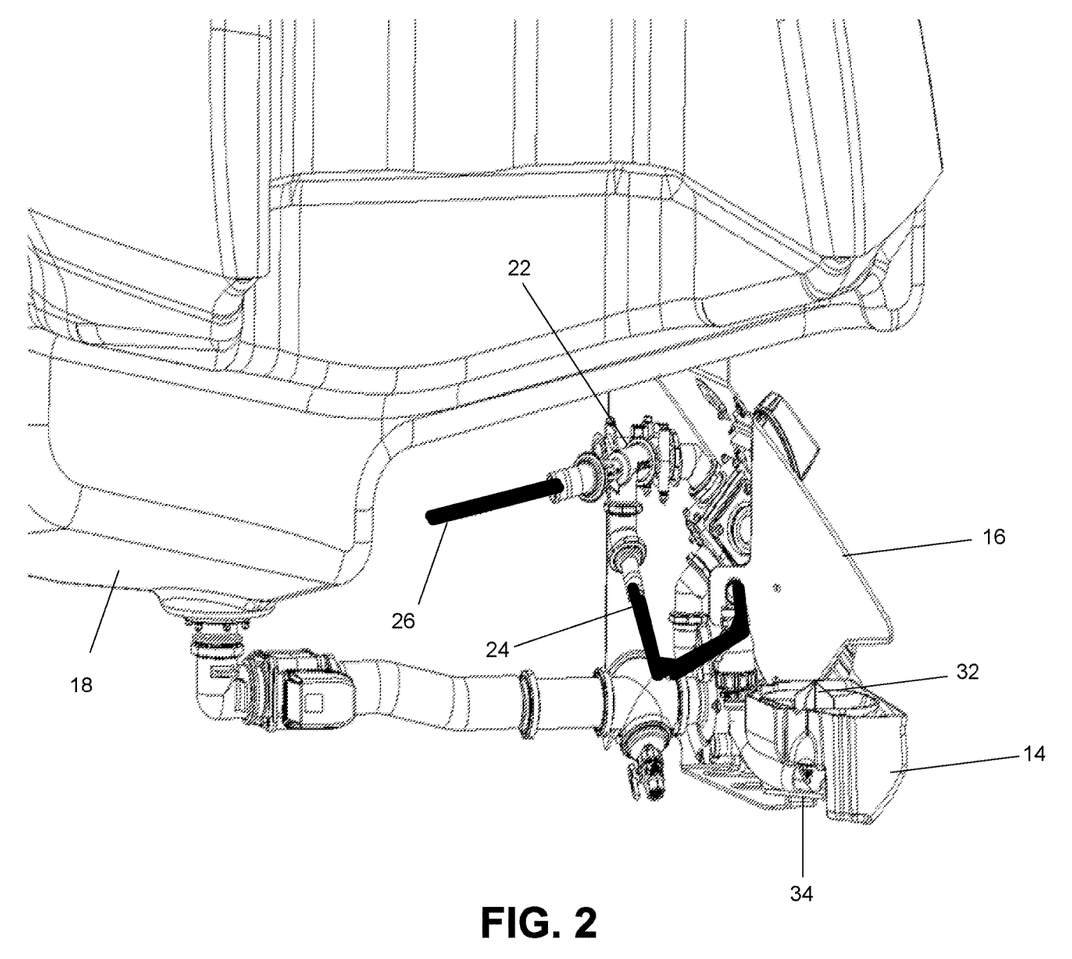
FIG. 2 is a schematic diagram that illustrates, in fragmentary view, a portion of example plumbing that connects an eductor, having an embodiment of a vortex prevention adapter, with a main tank.

FIG. 2 is a schematic diagram that illustrates, in fragmentary view, portions of the plumbing system 16 shown in FIG. 1. The plumbing includes, in relevant part, a venturi 22 coupled to the eductor 14 via a hose 24, the venturi 22 further coupled to the product tank 18 via a hose 26. It should be appreciated by one having ordinary skill in the art that other components may be used in the plumbing, including valves, pumps (visible in FIG. 2), meters, etc.

Figure 3:
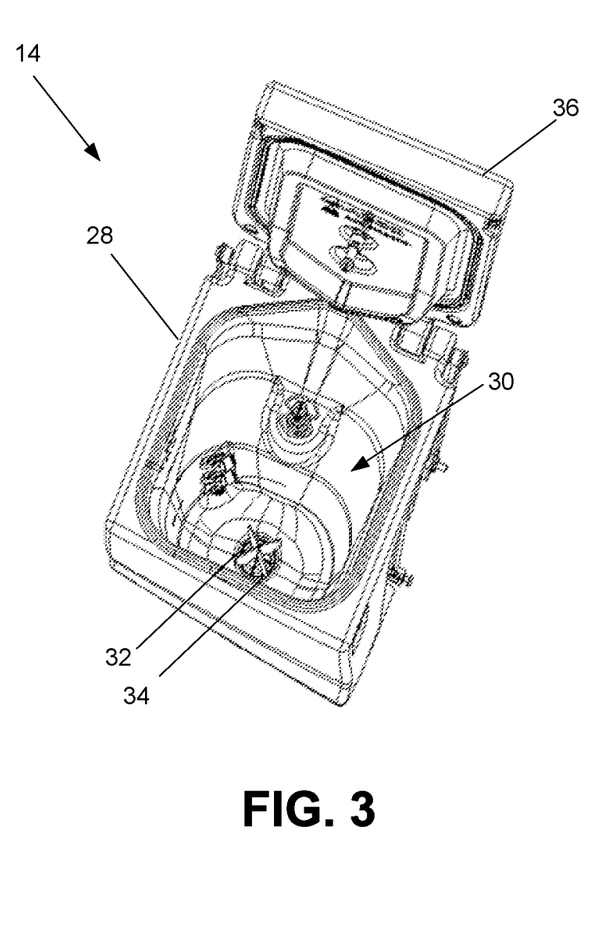
FIG. 3 is a schematic diagram that illustrates, in top perspective view, an example eductor equipped with an embodiment of a vortex prevention adapter.

FIG. 3 is a schematic diagram that illustrates, in top perspective view, the eductor 14 comprising a container 28 having a volumetric space 30, the container 28 including in the lower portion of the volumetric space 30 (e.g., bottom, though not limited to the bottom surface of the container 28) a vortex prevention adapter 32. In one embodiment, the volumetric space 30 may comprise, from top to bottom, a progressively (e.g., continuously or discontinuously) decreasing volume. For instance, the container 28 may have tapered surfaces (from top to bottom). At the bottom of the container 28 is an outlet or drain 34 (also referred to as a suction adapter) in which the vortex prevention adapter 32 is placed. The eductor 14 further comprises a lid 36.

In general, before spraying operations are initiated, the chemicals are mixed with water and transferred from an eductor 14 to the product tank 18. In one example operation, with continued reference to FIGS. 1-3, an operator opens the lid 36 and dispenses chemicals (e.g., in liquid or powder form) into the eductor 14, the chemicals occupying at least in part the volumetric space 30. The operator activates, at an interface, a filling operation, which initiates the filling of fresh water from the water tank 12 to the product tank 18 and also the ingress of fresh water through mixing nozzles of the eductor 14 (as explained below) to homogenize the chemical/water mixture. Note that in some implementations, the filling operation may involve the filling of fresh water into the product tank 18 from a well or storage tank external to the sprayer 10 or from the fresh water tanks 12 and/or 20. In either case, the eductor 14 may be activated to draw chemicals via the venturi 22 into the product tank 18 as explained further below. During this filling operation, the plumbing system 16, and in particular, the venturi 22, creates a suction effect in the eductor 14 to draw out the chemicals from the eductor 14. In other words, the chemicals are drawn through the vortex prevention adapter 32, the outlet 34, and the hose 24, through the venturi 22 and through the hose 26 to the product tank 18. The vortex prevention adapter 32 prevents the formation of a vortex in the lower portion of the volumetric space 30 of the eductor 14, which in turn prevents or reduces the amount of air in the plumbing system 16 and/or the product tank 18, enabling more efficient operations involving the spraying and rinsing processes when compared to such operations infiltrated with air. As the mixing of chemicals in the fresh water fill process is generally known to those having ordinary skill in the art, further description of that process is omitted here for brevity.

Figure 4A:
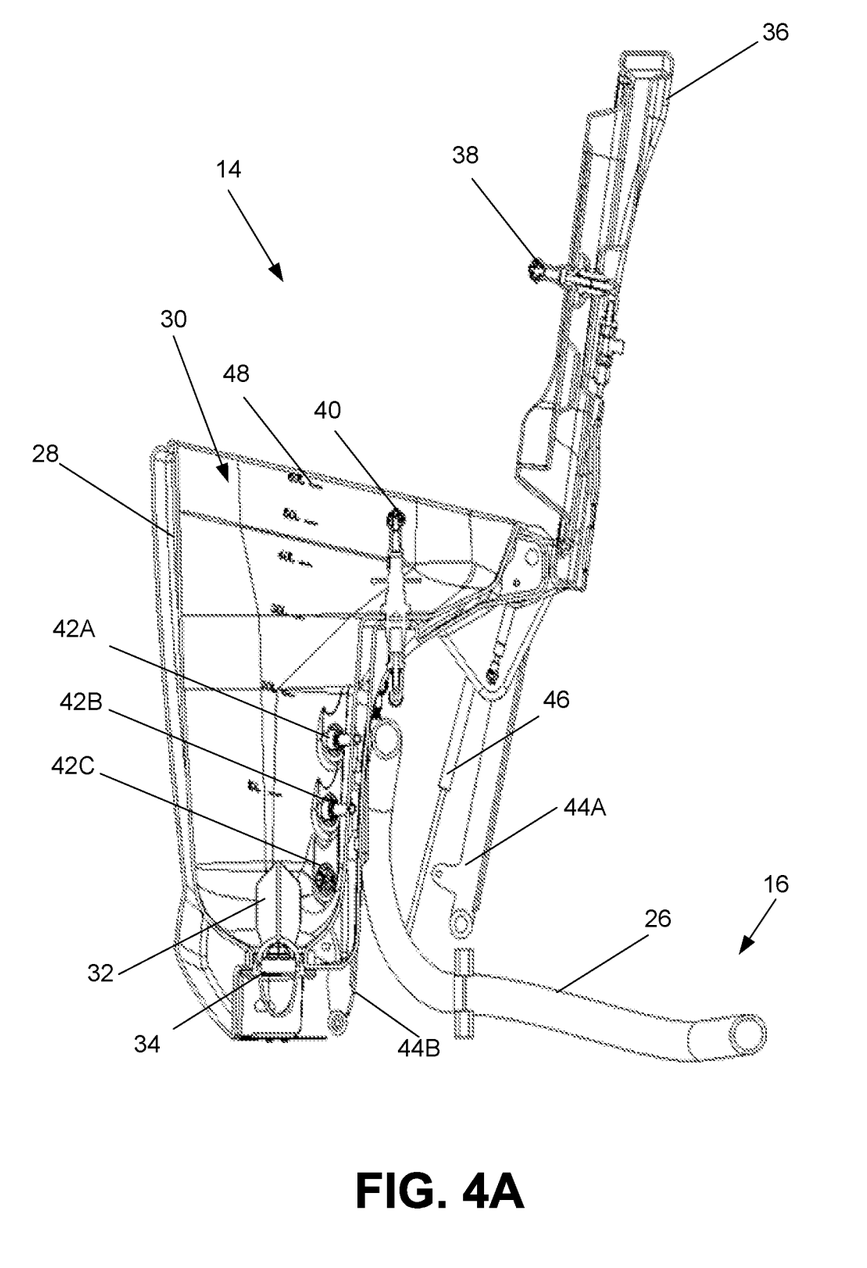
FIG. 4A is a schematic diagram that illustrates, in side elevation, cut-away view, the eductor of FIG. 3 equipped with an embodiment of a vortex prevention adapter.

FIG. 4A is a schematic diagram that illustrates, in side elevation, cut-away view, the eductor 14 of FIG. 3 equipped with the vortex prevention adapter 32. It should be appreciated by one having ordinary skill in the art, in the context of the present disclosure, that eductors or chemical containers of other designs with fewer, additional, or different features may be used and hence are contemplated to be within the scope of the disclosure. Aside from the vortex prevention adapter 32, the components of the eductor 14 are known, and include the lid 36 and the container 28. The lid 36 is pivotable about an axis and is opened and closed by an operator (or other personnel) to enable the dispensing of chemicals within the volumetric space 30. In one embodiment, the volumetric space 30 comprises volume indicators 48 that indicate to an operator filling the container 28 the volume of the chemical based on its level in the container 28 relative to the indicators 48. In one embodiment, the volume indicators 48 are posted in units of liters, but in some embodiments, other volume units may be used, and in some embodiments, the volume indicators 48 may be omitted. The lid 36 further includes a rinsing nozzle 38 disposed in a surface (e.g., secured and penetrating the surfaces) of the lid 36, the rinsing nozzle 38 used to clean the inside of the eductor 14. At the container 28, another rinsing nozzle 40 is disposed through a surface (e.g., secured and penetrating the surfaces) of the container 28 and used by the operator to rinse out chemical containers once the chemical is dispensed by the operator into the container 28. Further disposed in the surfaces of the container 28 are mixing nozzles 42 (e.g., 42A, 42B, and 42C). Though shown in FIG. 4 using three (3) mixing nozzles 42, a fewer or greater number may be used in some embodiments. The mixing nozzles 42 are used to mix liquids and powders with water that is fed from a fresh water supply and/or the water tanks 12 (and 20) via the plumbing 16. Also depicted in FIG. 4 is a parallelogram structure reaction upper arm 44A that is attached (shown unattached for illustration in FIG. 4A) to a parallelogram structure lower arm 44B to support the eductor 14 and make it foldable. A gas spring 46 is used to carry the weight of the eductor 14 to make the folding operation easier for the operator. Also shown in fragmentary view is a portion of the plumbing system 16 (e.g., hose 26) to provide a conduit for transport of the liquid or powder chemicals from the eductor 14 to the product tank 18. At the lower end (e.g., bottom) of the volumetric space 30 is the vortex prevention adapter 32, which is mounted to the outlet 34.

Note that the vortex prevention adapter 32 comprises a defined height that is a fraction of the height of the container 28. The choice of height is based on one or (more typically) more parameters, including the volume of the eductor 14, the surface area and/or shape of the container 28 (e.g., of the volumetric space 30, including the diameter of the eductor bowl, such as with a wider bowl diameter, the lower the level of the fluid surrounding the vortex prevention adapter 32 for the same volume (e.g., five (5) liters)), the suction capacity (e.g., of the (hydraulic) pump), the speed of the pump (e.g., revolutions per minute or RPM), and the configuration of the vortex prevention adapter 32 (e.g., the number of blades, shape of the blades, etc.). In the example vortex prevention adapter embodiment depicted in FIG. 4B and FIGS. 5A-5C, described further below, the height (H, from peak to bottom of the vortex prevention adapter 32, as shown in FIG. 5A) is approximately 135 millimeters (mm), and is based on an eductor environment where the volume of fluid in the tapered, volumetric space 30 surrounding the vortex prevention adapter 32 (between the top and bottom of the vortex prevention adapter 32) amounts to about five (5) liters, with a pump capacity of about 150 L/min (or 2.5 L/sec), resulting in a fluid dynamic where in two (2) seconds, the five (5) liters of fluid are drained. These values are mere examples, with other values for these parameters contemplated within the scope of the disclosure.

Figure 4B:
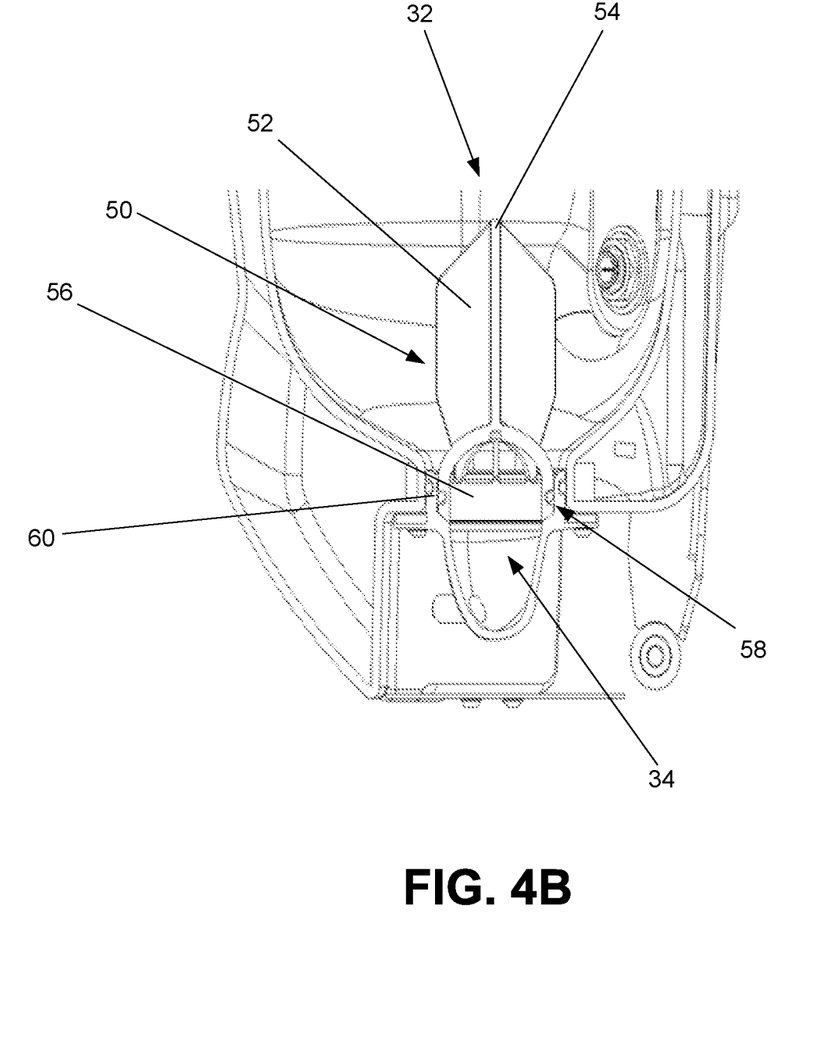
FIG. 4B is a schematic diagram that illustrates, in partial, cut-away view, an embodiment of the vortex prevention adapter as it is mounted on an outlet of the eductor.
Figure 5A:
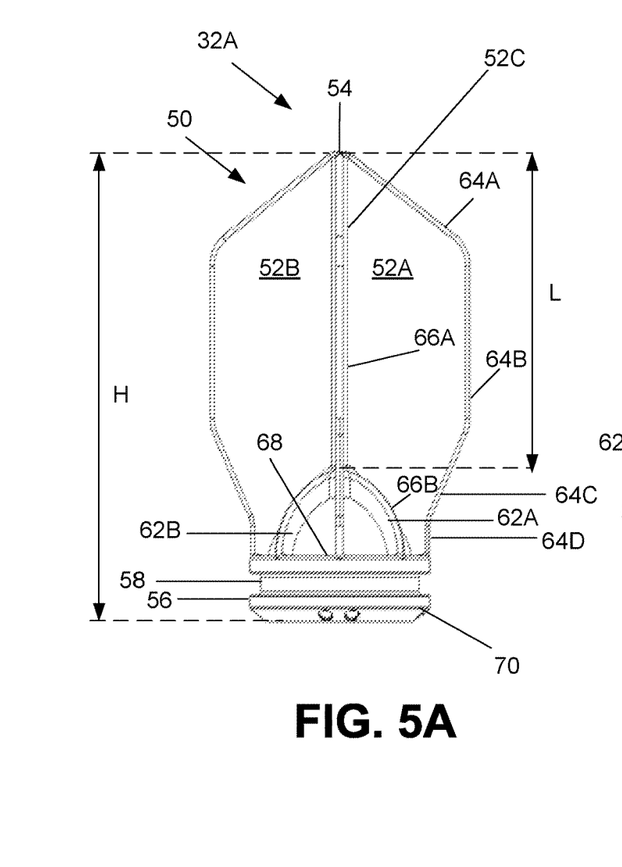
FIGS. 5A-5C are schematic diagrams that illustrate in side elevation, perspective, and overhead plan views, an embodiment of a vortex prevention adapter.

FIG. 4B shows a close-up, side elevation view of the vortex prevention adapter 32 of FIG. 4A, where the vortex prevention adapter 32 comprises a blade assembly 50 comprising plural blades 52 coupled to a center portion 54 and a gasket 56 on which the blade assembly 50 is mounted. The gasket 56 comprises a ring-shaped structure, with a circumferential recessed portion 58 in which a sealing member 60 is placed. For instance, the sealing member 60 may comprise an O-ring that fixes the vortex prevention adapter 32 and suction adapter (e.g., outlet 34) and seals the area between them. The sealing member 60 may be comprised of an elastomeric material or other known sealing material.

Figure 5B:
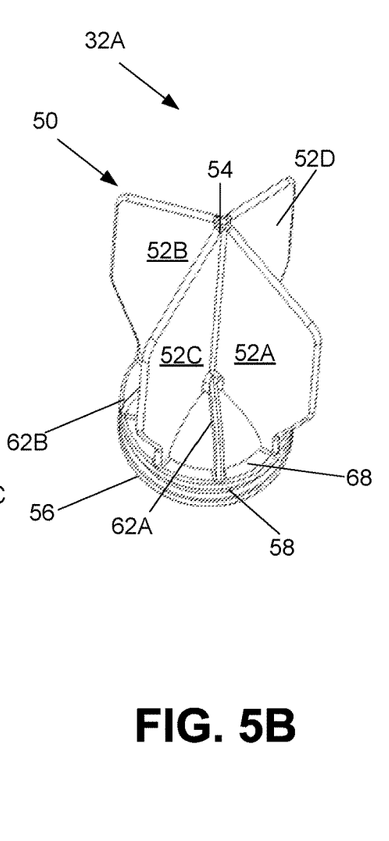
Figure 5C:
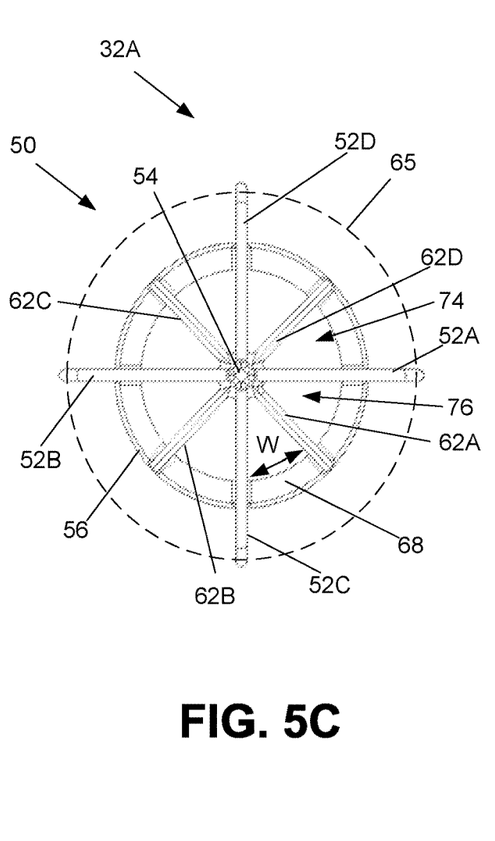

Having described an example system 10 and eductor 14 in which an embodiment of a vortex prevention adapter 32 may be used, attention is now directed to FIGS. 5A-5C, which illustrate, in various views, an embodiment of a vortex prevention adapter 32A. The vortex prevention adapter 32 is depicted with a blade assembly 50 comprising four (4) blades 52 (e.g., 52A, 52B, 52C, and 52D) and four (4) members 62 (e.g., 62A, 62B, 62C, and 62D), each extending between and coupled to a center portion 54 and the gasket 56 (which comprises a ring-shaped design). It should be appreciated by one having ordinary skill in the art, in the context of the present disclosure, that the example vortex prevention adapter 32A is one illustrative example, and that some embodiments may comprise a different quantity of blades, members, and/or a different geometric configuration of the blades and/or members. In such cases of these different embodiments, some of the description below may be altered, as should be appreciated by one having ordinary skill in the art. In some embodiments, additional blades 52 may result in fewer members 62. For instance, in one embodiment, for the same diameter gasket 56, members 62 (e.g., as shown in FIG. 5C) may all be replaced with blades 52. In one embodiment, the blade assembly 50 comprises at least three (3) blades. In one embodiment, the blade assembly 50 consists of anywhere between three (3) to six (6) blades, inclusive. In some embodiments, the blade assembly 50 consists of anywhere between three (3) to eight (8) blades, inclusive. The vortex prevention adapter 32A may be comprised of metal, plastic, or other material, entirely of one material (absent the sealing member) or as a combination of plural different materials. For instance, the vortex prevention adapter 32A may be comprised of polypropylene, GF 30, which is typical in the industry, though not limited to this type of material. In general, the material(s) selected for the vortex prevention adapter 32A should withstand prolonged and/or repeated chemical exposure. In one embodiment, the vortex prevention adapter 32A is an apparatus that may be fabricated using plural components that are attached to, or integrated with, each other according to any one or a combination of a variety of securing mechanisms (e.g., using any one or a combination of welded, tacked, adhesives, screws, rivets, etc.). For instance, the blades 52 and members 62 may be comprised of metal material, and welded to the center portion 54, and secured to the gasket 56 (e.g., welded, screwed, etc.). In some embodiments, the vortex prevention adapter 32A may be comprised entirely of an integrated assembly (e.g., the assembly made in one process) based on formation according to an injection molded or 3D printing procedure. In some embodiments, the vortex prevention adapter 32A may be formed according to a cast or forging procedure. In some embodiments, only a portion (less than the entire apparatus) of the vortex prevention adapter 32A may be formed according to an integrated formation procedure (e.g., cast, injection molded, 3D print, etc.), with one or more other portions fabricated.

In one embodiment, the blades 52 are equally spaced relative to one another (spaced equidistantly apart), and/or the members 62 are spaced equidistantly apart relative to one another. In some embodiments, there may be unequal spacing between the blades 52 and/or the members 62. The blades 52 are depicted as each having the same size and shape (e.g., same geometric configuration and dimensions), though in some embodiments, there may be differences in the shape or size between two or more blades 52. Similarly, the members 62 are depicted as each having the same size and shape (e.g., same geometric configuration and dimensions), though in some embodiments, there may be differences in size and shape between two or more members 62.

In the depicted embodiment, each blade 52 comprises an outer surface 64, the outer surface 64 (e.g., 64A, 64B, 64C, and 64D) comprising multiple outer edges forming an angular, geometrical configuration, and in the depicted embodiment, substantially a trapezoidal configuration formed by multiple outer edges of the blade 52. Viewing one of the blades 52A of FIG. 5A as an illustrative example, with applicability for all blades 52 in one embodiment, the blade 52A comprises a top-angled surface (edge) 64A, which extends at an angle from a peak of the center portion 54 to a first point at a height between the peak and the end of the center portion 54 (the end that is proximal to the gasket 56). Notably, the center portion 54 comprises one end proximal to the gasket 56 and another end distal to the gasket 56 (at a peak formed by the blade assembly 50), the center portion 54 extending in one embodiment vertically along a defined length, L that comprises a portion of the entire defined height of the vortex prevention adapter 32A. The outer surface 64 of the blade 52A further comprises an upright surface (edge) 64B that extends from the first point vertically down to a second point more proximal to a height corresponding to a low end of the center portion 54. The blade 52A further comprises a lower angled surface (edge) 64C that extends from the second point inward toward the center portion 54 to a third point that is at a height proximal to the gasket 56 and below the center portion 54. From the third point, the blade 52A comprises a lower, upright surface (edge) 64D that extends from the third point to the gasket 56. Each blade 52 has a similar configuration when, for instance, described in conjunction with the particular blade (e.g., 52B, 52C, or 52D) rotated in the position of the blade 52A in FIG. 5A. Further, it should be appreciated by one having ordinary skill in the art, in the context of the present disclosure, that the multiple edges of the outer surface 64 may be configured in other ways (e.g., non-trapezoidal, such as more triangular in configuration, including fewer edges, additional edges, and/or different angles, according to other geometric configurations. In one embodiment, the collection of the first points from the respective blades 52 that denote the transition between the top-angled surface (edge) 64A and the upright surface 64B conceptually form a circular plane as shown as a dashed circle 65 in FIG. 5C. In one embodiment, the circular plane comprises a circle 65 having a larger diameter than an outer diameter of the gasket 56. In some embodiments, the first points defining the circle 65 of the circular plane may be of a diameter that is equal to the outer diameter of the gasket 56.

Continuing, each blade 52 also comprises an inner surface 66 having a first inner surface 66A (or similarly, first portion) that is configured as a straight edge coupled and adjacent to the center portion 54 (or as integrated with the center portion 54) along the defined length, L, and a second inner surface 66B (also, second portion) that is configured in one embodiment in a curvilinear or arcuate geometry. In some embodiments, the second inner surface 66B may be configured as multiple edges (e.g., piece-wise linear or splined) or a single, straight edged geometry. Note that reference to the first inner surface 66A having a straight edge contemplates embodiments where the center portion 54 and the connection to each blade 52 comprise an integrated (single-piece) assembly. The second inner surface 66B extends between the lower end (e.g., lowest end) of the center portion 54 and the gasket 56. Stated otherwise, the lower edge of each blade 52 extends from the lower end of the center portion 54 to the gasket 56. The gasket 56 comprises a top surface 68 and a bottom surface 70, with a recessed portion 58 (where the sealing member 60, FIG. 4B, is placed) sandwiched in between the top surface 68 and the bottom surface 70. The second inner surface 66B for each blade 52 is coupled (e.g., fastened, welded, molded, etc.) to the top surface 68 of the gasket 56.

The spacing between adjacent blades 52 (e.g., between the blades 52A and 52B as a representative example), as best illustrated in FIG. 5C, define a first channel 74, when viewed in plan view, relative to the gasket 56. In this depicted embodiment, the first channel 74 resembles a pie-slice, having an arc segment geometry bisected (in at least one embodiment) by the member 62A. The first channel 74 enables fluid flow through from the volumetric space 30 (FIG. 3) and through the outlet 34 (FIG. 3).

Each member 62 extends from the lower end of the center portion 54 to the top surface 68 of the gasket 56. In the depicted embodiment (in FIGS. 5A-5C), the members 62 are arcuate in shape. In some embodiments, the members 62 comprise multiple edges (e.g., piece-wise linear or splined) or a single, straight-edge. In the four-blade embodiment depicted in FIG. 5C, each of the members 62 bisect the respective first channels 74 formed by each pair of blades 52 relative to the gasket 56. The combination of a member 62, one of the blades 52, and the gasket 56 define a filter or second channel. For instance, using blade 52A, member 62A, and the gasket 56, the second channel (filter) is denoted as 76. Note that there are plural second channels (filters) 76 in the vortex prevention adapter 32, though the collective amount of second channels 76 may be considered a filter assembly. The second channel 76 comprises each of the bisected portions (e.g., pie-shaped or arc-segments) of the first channel 74, and in one embodiment, has a width that determines what particles pass through the vortex prevention adapter 32 and which particles do not pass through and out of the outlet 34 (FIG. 3). In other words, the second channel 76 serves in one embodiment as a filter having a mesh size or filter size. In one embodiment, the width, W (determined proximal to the arcuate portion of the second channel 76 closest to the gasket 56), is 20 millimeters (mm) or less, which results in fluid flow passing through the second channel 76 while preventing particles having a dimension larger than 20 mm (or less, depending on the filter size requirements). Other filter size requirements may be used based on design and application considerations, which may change the structure and/or dimensions of the vortex prevention adapter 32.

It is noted that in some embodiments, the blades 52 alone may define the filter, with the filter size determined by spacing between a pair of blades 52 (e.g., adjacent one another). For instance, in one embodiment, the members 62 may be replaced by blades 52, while still retaining the size of the filter or second channel 76 (without any members). In some embodiments, eight blades 52 may be used in addition to members 62 (e.g., where filter size requirements demand the additional members in conjunction with the eight blades 52). In some embodiments, the filter size may be determined by a different quantity of blades and/or members depending on the configuration of the blade assembly 50.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality. Any reference signs in the claims should be not construed as limiting the scope.

What is claimed is:

1. A vortex prevention adapter, comprising:
a hollow cylindrical base defining a top surface, a bottom surface, an inner cylindrical surface, an outer cylindrical surface, and a circumferential recess in the outer cylindrical surface between the top surface and the bottom surface; and
a plurality of blades connected directly to one another along a central axis having an end proximal to and above the top surface of the base and an end distal from the base;
wherein an upper edge of each of the blades is nonlinear and extends from the distal end of the central axis to the top surface of the base such that the upper edges of each of the blades have at least one point defining a circle having a center on the central axis and a diameter larger than a diameter of the outer cylindrical surface of the base;
wherein a lower edge of each of the blades extends from the proximal end of the central axis to the top surface of the base; and
wherein adjacent pairs of the blades together define channels extending through the base.

2. The vortex prevention adapter of claim 1, further comprising a plurality of members extending from the proximal end of the central axis to the top surface of the base, each intersecting one of the channels.

3. The vortex prevention adapter of claim 2, wherein each member has a curved shape, a spline shape, or a straight-edge shape.

4. The vortex prevention adapter of claim 2, wherein a shape of each member is different from a shape of the blades.

5. The vortex prevention adapter of claim 1, wherein the plurality of blades comprises at least three blades.

6. The vortex prevention adapter of claim 1, wherein each blade of the plurality of blades has a geometric configuration in common with other blades of the plurality of blades.

7. The vortex prevention adapter of claim 1, further comprising a seal disposed in the circumferential recess of the base.

8. The vortex prevention adapter of claim 1, wherein the lower surface of each of the blades extends from the central axis to the top surface of the base along a nonlinear path.

9. The vortex prevention adapter of claim 1, wherein the hollow cylindrical base and the plurality of blades form a unitary body.

10. The vortex prevention adapter of claim 1, wherein the hollow cylindrical base and the plurality of blades comprise a polymer.

11. The vortex prevention adapter of claim 10, wherein the hollow cylindrical base and the plurality of blades comprise polypropylene.

12. A system, comprising:
a chemical eductor defining a volumetric space with a progressively decreasing cross sectional area that terminates at an outlet; and
a vortex prevention adapter disposed in the outlet, the vortex prevention adapter comprising:
a hollow cylindrical base defining a top surface, a bottom surface, an inner cylindrical surface, an outer cylindrical surface, and a circumferential recess in the outer cylindrical surface between the top surface and the bottom surface; and
a plurality of blades connected directly to one another along a central axis having an end proximal to and above the top surface of the base and an end distal from the base;
wherein an upper edge of each of the blades is nonlinear and extends from the distal end of the central axis to the top surface of the base such that the upper edges of each of the blades have at least one point defining a circle having a center on the central axis and a diameter larger than a diameter of the outer cylindrical surface of the base;
wherein a lower edge of each of the blades extends from the proximal end of the central axis to the top surface of the base; and
wherein adjacent pairs of the blades together define channels extending through the base.

13. The system of claim 12, wherein the vortex prevention adapter further comprises a plurality of members extending from the proximal end of the central axis to the top surface of the base, each intersecting one of the channels.

14. The system of claim 13, wherein each member has a curved shape, a spline shape, or a straight-edge shape.

15. The system of claim 13, wherein a shape of each member is different from a shape of the blades.

16. The system of claim 12, wherein the plurality of blades comprise at least three blades.

17. The system of claim 12, wherein the lower surface of each of the blades extends from the central axis to the top surface of the base along a nonlinear path.

18. The system of claim 12, further comprising a seal within a volume defined by the circumferential recess and the chemical educator.

19. The system of claim 18, wherein the seal comprises an O-ring.

20. The system of claim 12, wherein the base of the vortex prevention adapter is disposed within the outlet, and wherein the blades extend from the base toward a center of the volumetric space defined by the chemical educator.

* * * * *